(12) United States Patent
Cademartiri et al.

(10) Patent No.: US 10,442,055 B2
(45) Date of Patent: Oct. 15, 2019

(54) LUBRICATED MECHANICAL POLISHING

(71) Applicant: Iowa State University Research Foundation, Inc., Ames, IA (US)

(72) Inventors: Ludovico Cademartiri, Ames, IA (US); Briane Caroline Montoya, Denver, CO (US)

(73) Assignee: Iowa State University Research Foundation, Inc., Ames, IA (US)

( * ) Notice: Subject to any disclaimer, the term of this patent is extended or adjusted under 35 U.S.C. 154(b) by 95 days.

(21) Appl. No.: 15/530,575

(22) Filed: Jan. 31, 2017

(65) Prior Publication Data

US 2017/0239780 A1    Aug. 24, 2017

Related U.S. Application Data

(60) Provisional application No. 62/389,135, filed on Feb. 18, 2016.

(51) Int. Cl.
| | |
|---|---|
| *B24B 37/04* | (2012.01) |
| *C10M 125/10* | (2006.01) |
| *C09K 3/14* | (2006.01) |

(52) U.S. Cl.
CPC .......... B24B 37/044 (2013.01); C09K 3/1436 (2013.01); C09K 3/1472 (2013.01); C10M 125/10 (2013.01); *C10M 2201/062* (2013.01); *C10N 2220/082* (2013.01); *C10N 2240/10* (2013.01); *C10N 2240/401* (2013.01); *C10N 2250/12* (2013.01); *C10N 2280/00* (2013.01)

(58) Field of Classification Search
CPC .. B24B 37/044; C09K 3/1463; C09K 3/1472; C10M 125/10; C10N 2220/082
USPC .................................... 451/36, 41, 59
See application file for complete search history.

(56) References Cited

U.S. PATENT DOCUMENTS

| | | | | |
|---|---|---|---|---|
| 5,586,926 A | * | 12/1996 | Wedell | B24B 7/16 451/299 |
| 6,251,150 B1 | * | 6/2001 | Small | C09K 3/1427 106/3 |
| 6,383,239 B1 | * | 5/2002 | Suzuki | C09G 1/02 106/3 |
| 6,623,355 B2 | | 9/2003 | McClain | 457/60 |
| 6,786,945 B2 | | 9/2004 | Machii | 51/307 |
| 9,725,621 B2 | | 8/2017 | Zhang | 216/53 |
| 2001/0005009 A1 | | 6/2001 | Tsuchiya | 252/79 |
| 2001/0034979 A1 | | 11/2001 | Lee | 51/309 |
| 2003/0181144 A1 | * | 9/2003 | Mujumdar | B24B 7/241 451/41 |
| 2005/0050803 A1 | * | 3/2005 | Amanokura | C09G 1/02 51/309 |
| 2010/0279586 A1 | * | 11/2010 | Schwappach | B24D 11/00 451/28 |
| 2015/0255103 A1 | * | 9/2015 | Ueda | G11B 5/73 428/836 |

FOREIGN PATENT DOCUMENTS

GB          679561 A   *   9/1952   ......... C09K 3/1472

* cited by examiner

Primary Examiner — Eileen P Morgan

(57) ABSTRACT

A lubricated mechanical polishing (LMP) process is provided that uses hard nanoparticles of less than 5 nm diameter dispersed in a fluid lubricant as a polishing slurry to produce an ultra-smooth surface on a hard metallic or non-metallic substrate with a sub-nanometer surface roughness substantially less than that produced by silica chemical mechanical polishing.

13 Claims, No Drawings

LUBRICATED MECHANICAL POLISHING

RELATED APPLICATION

This application claims benefit and priority of provisional application Ser. No. 62/389,135 filed Feb. 18, 2016, the entire disclosure of which is incorporated herein by reference.

CONTRACTUAL ORIGIN OF THE INVENTION

This invention was made with government support under Grant No. DE-AC02-07CH11358 awarded by the U.S. Department of Energy. The government has certain rights in the invention.

FIELD OF THE INVENTION

This invention relates to the lubricated mechanical polishing of a hard substrate using hard nanoparticles dispersed in a fluid lubricant, such as motor oil.

BACKGROUND OF THE INVENTION

Currently, silicon oxide (silica) chemical mechanical polishing (CMP) is the highest quality slurry for a producing ultraflat surfaces, where an ultra-smooth surface can be an advantage to many applications to conserve energy, reduce friction, improve performance of integrated circuits, and reduce corrosion. For example, ball bearings can roll with less resistance and have less chance for corrosion, while lasting longer.

In such applications and others, there is a desire for a process for producing even smoother surfaces on hard ultra-smooth substrates.

SUMMARY OF THE INVENTION

The present invention provides a lubricated mechanical polishing (LMP) method to this end using hard nanoparticles dispersed in a fluid lubricant as a colloidally dispersed polishing solution. Practice of embodiments of the present invention can produce an ultra-smooth surface on a hard metallic or non-metallic substrate with a surface roughness substantially less than that produced by silica CMP mentioned above.

An illustrative embodiment of the present invention involves dispersing a small amount of metal oxide nanoparticles having a hardness greater than 7 Mohs and a diameter less than about 5 nm in a hydrophobic fluid lubricant, such as motor oil, to form a colloidally dispersed polishing solution, and then mechanically polishing the hard substrate using the slurry to produce an ultra-smooth surface on the substrate, wherein the ultra-smooth surface has a sub-nanometer RMS (root mean square) roughness, which is substantially less than that produced by a silica-based CMP process.

Pursuant to a preferred embodiment of the invention, colloidal zirconium oxide ($ZrO_2$) nanoparticles having a diameter less than about 5 nm and functionalized with a ligand (for example, including but not limited to, trioctylphosphine oxide, oleic acid, oleylamine, and other moieties that allow the particles to form stable colloidal dispersions in a fluid) are dispersed in SAE 20 motor oil (Society Automotive Engineers SAE developed grading system for the different viscosities) to form a colloidally dispersed polishing solution that is used to mechanically polish a hard substrate. A sub-nanometer RMS roughness of about 3 Å to about 5 Å can be produced compared to about 7 Å produced using the silica CMP process on an austenitic Type 316 stainless steel substrate.

Advantages and other features of the present invention will become more readily apparent from the following detailed description.

DETAILED DESCRIPTION OF THE INVENTION

The present invention provides a lubricated mechanical polishing (LMP) method which uses hard nanoparticles dispersed in a fluid lubricant to create a colloidally dispersed polishing solution. Practice of embodiments of the present invention can produce an ultra-smooth surface on a hard metallic or non-metallic substrate with a sub-nanometer surface roughness substantially less than that produced by the silica CMP method. The present invention can be practiced to produce ultra-smooth surfaces on such hard substrates that include, but are not limited to, metals (e.g. stainless steel), metal carbides (e.g. tungsten carbide), and plastics (e.g., polycarbonate).

Pursuant to an illustrative embodiment of the present invention, a small amount of small, hard nanoparticles are dispersed in a fluid lubricant to form a colloidally dispersed solution. The nanoparticles employed in practice of the invention preferably have a hardness value greater than 7 Mohs and a diameter less than about 5 nm. The hard nanoparticles are present in an amount of about 0.5 to about 2 weight % of the polishing slurry.

Although colloidal zirconium oxide nanoparticles are described in the examples below, practice of the invention is not limited to these nanoparticles and can be practiced using other nanoparticles including, but not limited to, colloidal $HfO_2$ nanoparticles of similar size as well as other hard sterically-stabilized colloidal metal oxide nanoparticles such as $Fe_2O_3$, $Fe_3O_4$, $TiO_2$, $W_{18}O_{49}$, Mn oxides, ZnO, $Nb_2O_5$, $Ta_2O_5$, $Co_3O_4$, and $Y_2O_3$ as well as the metal sulfides and metal phosphides such as PbS, CdS, ZnS, $Bi_2S_3$, $Sb_2S_3$, InP, FeP, $Fe_xS_y$, $Cu_2S$. The colloidal zirconium oxide ($ZrO_2$) nanoparticles described in the examples below are the hardest currently synthesizable at this time with a size of less than 5 nm.

Hard colloidal $ZrO_2$ nanoparticles having a size of less than about 5 nm diameter (e.g. 3.5 nm in diameter) can be synthesized in toluene and coated or capped with a ligand; i.e. trioctylphosphine oxide (TOPO) to provide sterically-stabilized nanoparticles.

Standard Procedure for Synthesis of Monodisperse Zirconia Nanocrystals

Large Scale Synthesis of About 3.5 nm Diameter Colloidal Zirconia Nanoparticles

Set up cooling trap for pump and condenser.

Put 80 grams of TOPO (90% purity from Strem Chemicals) in 500 mL 3-neck flask with glass stirrer. Insert the thermocouple in one of the side neck septa.

Liquefy the TOPO by heating it to 80° C.

Then run the vacuum and argon cycle 3 times using a Schlenk line, and finally leave it under vacuum for 30 minutes. Turn off vacuum.

Restore argon flow through the flask (flow of gas is allowed by inserting syringe needle in one of the flask neck-needles need to be replaced as they become clogged)

Weigh the zirconium precursors: 16 mmol (6.24 grams) zirconium (IV) isopropoxide propanol complex and 20 mmol (4.68 grams) zirconium (IV) chloride. Both the precursors are from Sigma Aldrich. Pour the precursors from the center neck (remove from condenser, lower flask, while stirring and add precursors.

Heat the reaction volume to 340° C. (it will take approximately 40-60 minutes) and hold at that temperature for 2.5 hours.

After completion of reaction, cool down the reaction product to about 80° C. (remove heat, but keep stirring) and then pour the product in 80 mL of toluene. Therefore, the final volume of dilute reaction product is now 160 mL at 1% weight zirconia.

** for smaller batch of synthesis simply adjust the ratio 100 gm (TOPO):: 20 mmol (Zr-iso):: 25 mmol (Zr—Cl)

Cleaning of Nanoparticles

Divide the aforementioned final volume into four of the 50 ml centrifuge tube (equal volume is important for centrifuge instrument to maintain balance) and centrifuge it at 3000 rpm for 3 minutes. Keep the supernatant and discard the precipitate. Supernatant will look more transparent after this step.

Distribute the supernatant of 10 ml each, in 50 ml centrifuge tubes. Add 20 ml of acetone to destabilize the nanocrystals wherein the centrifuge can accommodate maximum 16 of those tubes.

Centrifuge at 1000 rpm for 1 minute. This time discard the supernatant and disperse the precipitate in 10 mL acetone each. Centrifuge at 1000 rpm for 1 minute. Repeat this acetone washing 2 more times. These washing steps are used to remove excess TOPO from the product. The number of centrifuge tube steps may be reduced.

Finally, redisperse the precipitate in toluene or hexane. The concentration of nanoparticles that typically is needed for spin-coating, prepared by dispersing the particles from the batch into 40 ml of solvent.

Then, centrifuge those dispersions at 4000 rpm for 10 minutes. Save the supernatant and discard any precipitate. Supernatant is the cleaned product. This step will remove any colloidally unstable particles.

Final step is to filter the cleaned product, using 0.2 um nylon filter, to remove any aggregate bigger than 200 nm.

Transfer Particles into Motor Oil.

Add 20 ml acetone to 10 ml cleaned zirconia product. Centrifuge at 1000 rpm for 1 minute.

Discard supernatant and disperse final product into 2 of the 50 ml tubes and top off to 40 ml of motor oil SAE 20. Total volume of 80 ml.

Shake vigorously until white particles are dispersed

Split 80 ml into four (4) of the 50 ml tubes and top off to 40 ml with motor oil.

Shake the four (4) tubes of 40 ml vigorously.

Final volume will be 160 ml centrifuged at 5,000 rpm for 30 minutes.

Keep top ⅔ supernatant and should have a final volume of around 100 ml.

1 weight % for 160 ml for final product volume.

The colloidal $ZrO_2$ nanoparticles synthesized in this way are not stable in water, which is the standard solvent for CMP, but they are stable in toluene and other organic solvents.

When the invention is practiced using TOPO-capped $ZrO_2$ nanoparticles as described in the examples below, the fluid lubricant must be compatible with toluene. In the examples below, such a compatible fluid lubricant comprises SAE 20 motor oil. However, practice of the invention is not limited to this motor oil and can be practiced using any hydrophobic solvent in which the nanoparticles can form a stable colloidal dispersion including, but not limited to, typically, toluene, hexane, xylenes, mesitylene, etc.

Practice of the invention involves dispersing the hard nanoparticles in the fluid lubricant to form a colloidally dispersed polishing solution. As mentioned above, the hard nanoparticles are present in an amount of about 0.5 to about 2 weight % creating a colloidally dispersed polishing dispersion. For purposes of illustration and not limitation, the colloidal hard nanoparticles can be dispersed in the fluid lubricant by vigorously shaking the lubricant/particles for 2 minutes until no cloudiness remains in the solution.

The polishing fluid then can be used to mechanically polish the substrate using conventional mechanical polishing equipment, such as a Buehler Ecomet 3 polishing machine using an Ecomet 3 pad mount, the Automet 2 specimen mount to mount the specimen holder to the Automet head, and the Primet 3000 fluid dispenser to dispense fluids. This is done to achieve sub-nanometer surface roughness without chemically etching the substrate. Practice of embodiments of the present invention produce an ultra-smooth, mechanically-polished surface on the substrate, wherein the ultra-smooth surface has a sub-nanometer RMS (root mean square) roughness substantially less than that produced in the silica CMP process.

For example, in the examples set forth below, colloidal zirconium oxide ($ZrO_2$) nanoparticles having a diameter less than about 5 nm and functionalized with the TOPO ligand are dispersed in SAE 20 motor oil to form a colloidally dispersed polishing solution that is used to mechanically polish a hard austenitic Type 316 stainless steel substrate to a sub-nanometer RMS roughness of about 3 Angstroms, which is a nearly atomically flat surface. This compares to a surface roughness of about 7 Angstroms produced using the silica CMP process on the austenitic Type 316 stainless steel substrate.

The following examples are set forth to illustrate the practice of embodiments of the invention in more detail without limiting the scope of the invention.

Example 1

This example demonstrates effectiveness of embodiments of the invention on stainless steel surfaces using zirconium dioxide (zirconia) nanoparticles in motor oil in yielding results that are superior to those obtained by state-of-the-art chemical mechanical polishing (CMP). The compatibility of zirconia with various solvents, the zirconia concentration, pad pressure, pad rotational direction, types of pads and polishing time were all investigated to achieve results that are superior to those obtained by state-of-the-art chemical mechanical polishing (CMP). In the examples, the mechanically polished (LMP) substrates were characterized by Atomic Force Microscope imaging and data collection for comparing to the control (CMP) samples polished with silica slurry (CMP is a chemical mechanical polishing process).

The examples used the hard colloidal $ZrO_2$ nanoparticles having a size of 3.5 nm in diameter synthesized in 2 weight % toluene and coated or capped (functionalized) with a ligand; i.e. trioctylphosphine oxide (TOPO), as described in detail above. These particles are not stable in water (which is the standard solvent for CMP) but are stable in toluene, other organic solvents, and most lubricating oils.

Hard $ZrO_2$ colloidal nanoparticles in toluene were transferred into different solvents (lubricants) by injecting a highly concentrated toluene dispersion of them in different solvents.

Different solvents (lubricants) initially were investigated since use of different solvents was observed to lead to different degrees of particle aggregation, which was discernible during polishing by the occurrence of scratches visible to the naked eye. The scratching was also audible during the polishing. This initial diagnostic procedure allowed the high throughput selection of certain optimized parameters for polishing such as nanoparticle concentration (about 1 wt % $ZrO_2$ nanoparticles) and amount of polishing solution to dispense (use 3 ml to prewet the polishing pad and then drip at a steady pace 1 drop every 4 seconds to maintain the pad's moisture such that after 5 seconds, the pad should be saturated) to be used in the following examples, which employed the Buehler mechanical polishing machine model Buehler Ecomet 3 and Buehler polishing pads listed in "Test Equipment" below.

Motor oil SAE 20 was found to be compatible with the hard $ZrO_2$ colloidal nanoparticles in toluene. The motor oil serves to disperse the nanoparticles, lubricate their rolling, and does not dry up like toluene as explained below. Toluene was then removed from the product by evaporation and only used in cleaning the pad.

The Buehler Ecomet 3 polishing machine mounts the polishing pad to a plate using glue that adheres to the polishing pad. However, the Buehler polishing pad glue (on the back of polishing pads) is dissolved by toluene solvent and crimples the pad. To avoid this, magnetic pads (which are held in place without glue) were used initially with the hard particles dispersed in toulene solvent, but did not lead to satisfactory polishing as a result of the toluene solvent drying too quickly and the nanoparticles would agglomerate and form large particles that would scratch the substrate instead of polishing it. This problem was solved by, as mentioned above, use of motor oil SAE 20 (sans toluene) to disperse the nanoparticles very effectively and prevent their aggregation, lubricate their rolling, and not dry up like toluene.

To accommodate the use of the magnetic polishing pad, a low contact pressure of the pad on the sample was found best to achieve polishing so that the nanoparticles dispersed in the motor oil can roll and not grind or push the nanoparticles on or into the substrate surface. However, insufficient pad pressure was found to give unsatisfactory results.

A contact weight between the polishing pad and the substrate of 2 pounds (corresponding to a pressure of 3,745 Pa) was found optimal to have the particles rolling and achieve desired mechanical polishing using the particles dispersed in the motor oil. This was confirmed by observation of little or no polishing noise and visual inspection of the substrate surfaces. A contact pressure in the range of 1800 Pa to 5600 Pa can be used however.

Moreover, the direction of rotation of the polishing pad had a substantial impact. It became very clear that switching the direction of rotation during polishing made the dispersion more abrasive and was not ideal to achieve mechanical polishing to sub-nanometer surface roughness.

Making the Sample

The sample of Type 316 austenitic stainless steel was cut from a starting rod (13 mm to 16 mm diameter). The rod was cut using a Linear Precision Saw (Buehler) Iso Met 5000 to cut about 5 mm thick slices for samples. The cutting speed was set to 1650 rpm and time to cut to 5 mm per minute, and 14 mm distance to cut. Burs were sanded off with a 320 grit paper by hand to make a flat surface. Sample dimensions (disk shaped) were 5 mm thick and the width (diameter) varied from 13 mm or 16 mm depending on the width (diameter) of rod.

A Buehler blue mold container (see Testing Equipment list—"Buehler SamplKups") was prepared by removing any old permanent marker marks on the outside with acetone and using a rust inhibitor as a release agent for the inner blue mold container prior to laying sample down flat inside blue mold container and epoxy. Epoxy was prepared according to Buehler instructions using Epoxicure and Epoxy hardener (1 to 5 ratios or the 1 to 4 ratio). Then, air was vacuumed out of the epoxy once mixing was done. Epoxy then was added on top of each sample inside the blue mold container. Air was removed by vacuum again, and then the samples were dried overnight or for 8 hours.

Each sample was removed from blue mold container by removing the bottom lid and pushing the sample out of the container. Using the Buehler Ecomet 3 machine, any epoxy covering the metal sample surface was removed. Any sharp edge on backside of sample was removed. Any dust and epoxy was removed off of the sample. At this stage, the sample was ready for polishing. The samples and polishing tests made and used the samples in sets of three. This ensures the balance of the polishing machine while polishing.

Polishing Set Up:

Each of three (3) samples at a time was placed inside a respective Buehler specimen holder ("Buehler SamplKups"). In every other holed slots of the specimen holder, a placement holder was placed to fill the empty specimen holder slots.

Polishing—320 Grit:

Start with 320 Grit, set "fluid" to "water", "rotations per minute" to 120 for 1 minute, apply 15 pounds of weight and set the direction of the specimen holder rotation to the right. Clean samples off with Ivory dish soap, water and cotton to remove any particles from the 320 grit sand paper. Clean with ethanol for fast drying.

Polishing—400 Grit:

Change grit paper to 400. Set "fluid" to "water", "rotations per minute" to 120 for 1 minute, apply 15 pounds of weight and set the direction of the specimen holder rotation to the right. Clean samples off with Ivory dish soap water and cotton to remove any particles from the 400 grit sand paper. Clean with ethanol for fast drying.

Polishing—600 Grit:

Change grit paper to 600. Set "fluid" to "water", "rotations per minute" to 120 for 1 minute, apply 15 pounds of weight and set the direction of the specimen holder rotation to the right. Clean samples off with Ivory dish soap, water and cotton to remove any particles from the 600 grit sand paper. Clean with ethanol for fast drying.

Comparison Polishing Experiments:

The following comparison polishing experiments were conducted using a three (3) bottle Buehler Primet 3000 fluid dispenser, where the following procedure applies to the Buehler Primet dispenser to have accurate amount of fluids dispersed equally to eliminate human error:

Prime all 3 polishing slurries-containing bottles as follows:

The 3 bottles primed are for the 6-micron diamond slurry, 1-micron diamond slurry, and the 20-70 nm colloidal silica slurry to remove air in line to have controlled amounts dispersed. Prepare 3 ml of polishing slurry, and then every 4 seconds drip a drop onto pad to maintain pad saturation.

In particular, prime one at a time starting (bottle #3) with 6-micron diamond, brown slurry. Then the 1 micron diamond (bottle #2) which is dark blue in color and then the silica slurry which is light blue (bottle #1). This makes it easier to reduce any cross-contamination.

6 Micron Diamond Polishing:

Change pad to TexMet. pad (see Test equipment list). Manually dispense slurry on pad to prepare pad prior to cycle. Have the fluid setting on auto so it dispenses fluid throughout cycle as programmed as described above. Set fluid to "other", rotations per minute to "120" for 4 minutes, 15 pounds of weight and the direction of the specimen holder rotation to the left. Clean samples off with Ivory dish soap, water and cotton to remove any particles from the 6-micron diamond slurry. Clean with ethanol for fast drying. Spray air hose for fast drying reduce stains left on surface. Polishing pad does not require cleaning 1-Micron Diamond and 20-70 nm Colloidal Silica Polishing Change pad to Master Tex. pad (see Test Equipment list). Manually dispense slurry on pad to prepare pad prior to cycle. Have the fluid setting on auto so it dispenses fluid through out cycle as programmed as described above. Set fluid to "other", rotations per minute to "120" for 4 minutes, 15 pounds of weight and the direction of the specimen holder rotation to the right. Clean samples off with Ivory dish soap water and cotton to remove any particles from the 1-micron diamond and 20-70 nm colloidal silica slurry. Clean with ethanol for fast drying. Spray air hose for fast drying reduce stains left on surface. Fifteen (15) seconds prior to the end of the cycle turn water on to clean pad.

20-70 nm Colloidal Silica Polishing

Change pad to Master Tex. pad (see Test Equipment list). Manually dispense slurry on pad to prepare pad prior to cycle. Have the fluid setting on auto so it dispenses fluid through-out cycle as programmed as described above. Set fluid to "other", rotations per minute to "120" for 2 minutes, 15 pounds of weight and the direction of the specimen holder rotation to the right. Clean samples off with Ivory dish soap water and cotton to remove any particles from the 1-micron diamond and 20-70 nm colloidal silica slurry. Clean with ethanol for fast drying. Spray air hose for fast drying reduce stains left on surface. Completely dry samples and specimen holder so that there is no water present. Fifteen (15) seconds prior to the end of the cycle turn water on to clean pad. Silica dispenser is programmed to clean itself so be careful of it spraying at end of cycle.

After polishing with the silica slurry, it is hard to see any roughness with the naked eye. It will appear to have a mirror finish after the silica polishing process. Beyond this step, AFM was used to determine roughness.

Polishing Experiments Pursuant to the Invention:

The following polishing experiments pursuant to embodiment of the invention also were conducted using a three (3) bottle Buehler Ecomet 3 polishing machine, Automet 2 specimen mount, and Primet 3000 fluid dispenser, where the following procedure applies to that Buehler machine:

Lubricated Mechanical 1% wt. 3.5 nm Zirconia Particle in Motor Oil Polishing

Change pad to Master Tex. pad (see Test Equipment list). Manually dispense slurry on pad to prepare pad prior to cycle. Shut fluid settings off, set rotations per minute to 120 for 2 minutes, with 2 pounds of weight and the direction of the specimen holder rotation to the right. Prepare 3 ml of slurry, and then every 4 seconds drip a drop of slurry onto the pad to maintain saturation. Clean samples off with toluene to remove any zirconia particles, then with Ivory dish soap water and cotton to remove any remaining particles. Clean with ethanol for a fast dry so it does not get water stains. Spray air hose for fast drying reduce stains left on surface. Remove samples from specimen holder. Put samples in a beaker with methanol and place in the Blue Wave Ultrasonics sonicator for 10 minutes.

Remove three samples from the sonicator and turn on the hot blow drier. As each sample is removed out of the beaker, one at a time with forceps, spray sample off with methanol for final cleanse and place under drier. Then place a cap over the sample to keep dust off. Repeat for all three samples and label each sample. The pad does not require cleaning.

Test Equipment Used for Experiments:

Buehler Ecomet 3—Polishing machine with pad mount

Buehler Automet 2—Specimen mount

Buehler Primet 3000—Fluid dispenser

Linear Precision Saw (Buehler) Iso Met 5000

Sample of 316 Stainless Steal Rod

Speed-1650 rpm

Time set to cut-5 mm/min

Distance-may very depending upon blade and width of the rod

Dimension of sample are 5 mm deep, width will vary 13 mm, 16 mm

Release Agent-rust inhibitor

Buehler Epoxy Hardener, Epoxicure (1 to 5 ratios)

Buehler SamplKups=blue mold containers 320 grit sand paper 400 grit sand paper 600 grit sand paper Buehler TexMet P Pad-Hard perforated non-woven wool cloth made to polish with 6 to 1 micron diamond Buehler Master Tex Pad-Soft synthetic velvet with low nap cloth made to polish 100 to 50 nm Alumina or Silica Results of AFM:

The results of the above test reveal that the state-of-the-art polishing slurries; namely, the 6-micron diamond polishing; the 1-Micron Diamond and 20-70 nm colloidal silica polishing; and the 20-70 nm colloidal silica CMP produced much higher surface values than the LMP of 1% wt. 3.5 nm zirconia nanoparticles in motor oil polishing. In particular, the results shown below are remarkable and demonstrate that, while the best state of the art polishing (i.e. 20-70 nm colloidal silica CMP) can produce an RMS roughness of 0.753 nm, the lubricated mechanical polishing (LMP) process achieved a RMS roughness of 0.314 nm, which is very close to an atomically flat surface.

| Quantity | Test Results for silica CMP | Test Results for LMP |
| --- | --- | --- |
| Image Raw Mean | −0.0410 nm | −0.00689 nm |
| Image Mean | −0.0410 nm | −0.00689 nm |
| Image Z Range | 10.7 nm | 10.7 nm |
| Image Surface Area | 3.99 μm$^2$ | 3.97 μm$^2$ |
| Image Projected Surface Area | 3.97 μm$^2$ | 3.97 μm$^2$ |
| Image Surface Area Difference | 0.477% | 0.140% |
| Image Rq | 0.753 nm | 0.314 nm |
| Image Ra | 0.591 nm | 0.220 nm |
| Image Rmax | 10.3 nm | 10.6 nm |
| Raw Mean | 0.00 nm | 0.00 nm |

Image Rq is the surface root mean squared roughness (RMS).

Image Ra is the average roughness.

Image Rmax is the maximum roughness: the height difference between the highest and lowest data points in the image.

These results are important and advantageous for the following reasons:

1. The LMP method pursuant to the invention does not involve chemicals. The polishing is purely mechanical and, therefore, should be applicable to any hard material, regardless of composition.

2. The LMP method employs nanoparticles much harder than silica such that this method could polish ultrahard materials that cannot currently be used in certain applications because they cannot be made sufficiently smooth.

3. The LMP method employs nanoparticles much smaller than the silica slurries, and therefore can achieve much lower RMS roughness and therefore lead to flatter surfaces that are more wear resistant, less prone to corrosion, producing less friction, reduce electrical migration.

4. The LMP process can use motor-oil already used as the most common lubricant for moving parts.

Example 2

This example demonstrates effectiveness of embodiments of the invention on tungsten carbide surfaces using zirconium dioxide (zirconia) nanoparticles in motor oil.

Lubricated Mechanical 1% wt. 3.5 nm diameter Zirconia Particle in Motor Oil Polishing Essentially the same protocol was used as described above for LMP of the Type 316 stainless samples. The only difference from that protocol was time of polishing which for one WC sample was longer (i.e. for 30 minutes) and another for 45 minutes. The tungsten carbide samples were cut from a square rod with a diamond blade saw. These experiments produced an AFM measured surface roughness of $R_q$=1.22 nm. In contrast, CMP commonly uses silicon dioxide (silica) particles that are too soft to feasibly polish tungsten carbide surface.

Although the present invention has been described above with respect to certain illustrate embodiments, those skilled in the art will appreciate that changes and modifications can be made therein without departing from the spirit and scope of the invention as set forth in the appended claims.

We claim:

1. A method of producing an ultra-smooth surface on a substrate, comprising dispersing hard nanoparticles having a hardness greater than 7 Mohs and a diameter dimension less than 5 nm in a hydrophobic organic fluid lubricant to form a polishing slurry and mechanically polishing the substrate using the slurry without chemical etching of the substrate to obtain an RMS surface roughness of about 3 A to about 5 A.

2. The method of claim 1 wherein the hard nanoparticles comprise metal oxide nanoparticles.

3. The method of claim 2 wherein the hard metal oxide nanoparticles comprise zirconium oxide.

4. The method of claim 1 wherein the nanoparticles are functionalized with a ligand.

5. The method of claim 1 wherein the hard nanoparticles are present in an amount of about 0.5 to about 2 weight % of the polishing slurry.

6. The method of claim 1 wherein the lubricant is a motor oil.

7. The method of claim 1 wherein the substrate is comprises a metal or alloy.

8. The method of claim 1 wherein the substrate comprises a metal carbide or metal nitride.

9. A metal or alloy substrate having a sub-nanometer RMS surface roughness of about 3 to about 5 Angstroms produced by the method of claim 1.

10. The substrate of claim 9, which is a steel or a metal carbide.

11. A method of producing an ultra-smooth surface on a substrate, comprising dispersing hard colloidal zirconium oxide nanoparticles having a diameter less than 5 nm in a motor oil to form a polishing slurry and mechanically polishing the substrate using the slurry without chemical etching of the substrate to achieve a sub-nanometer RMS surface roughness of about 3 A to about 5 A on the substrate.

12. The method of claim 11 wherein the nanoparticles are functionalized with a ligand.

13. The method of claim 11 wherein the motor oil is SAE 20 motor oil.

* * * * *